(No Model.)
H. CAVE.
CRUPPER FOR RESTRAINING HORSES FROM KICKING.
No. 569,812.   Patented Oct. 20, 1896.
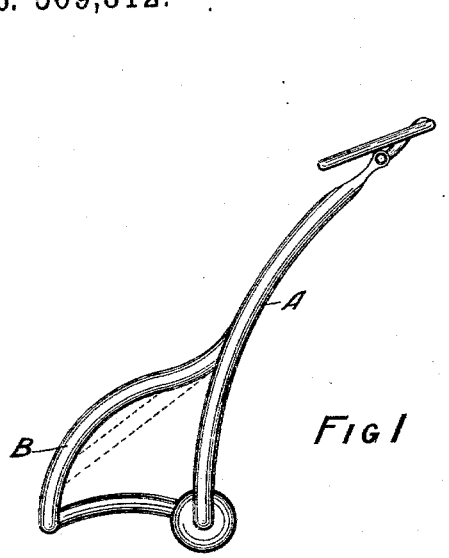
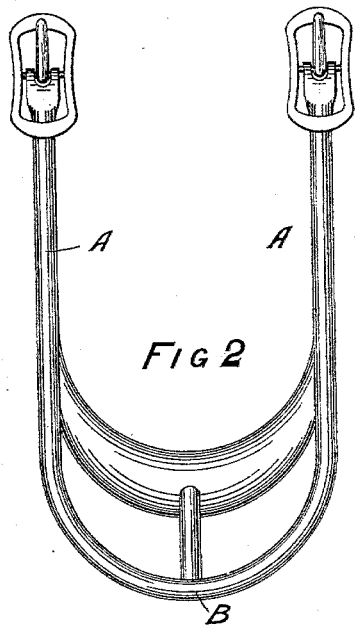
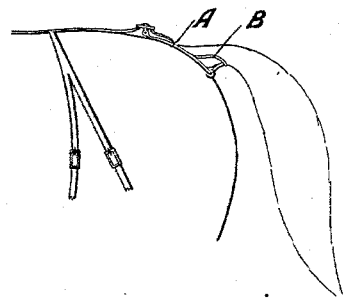
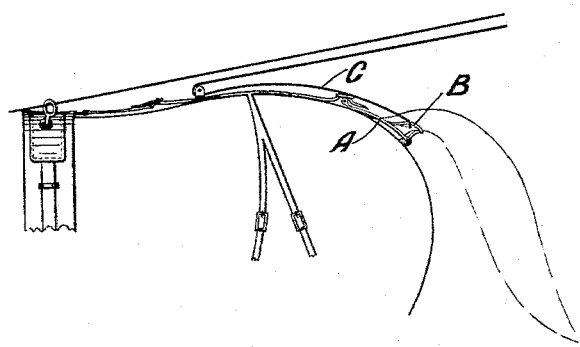
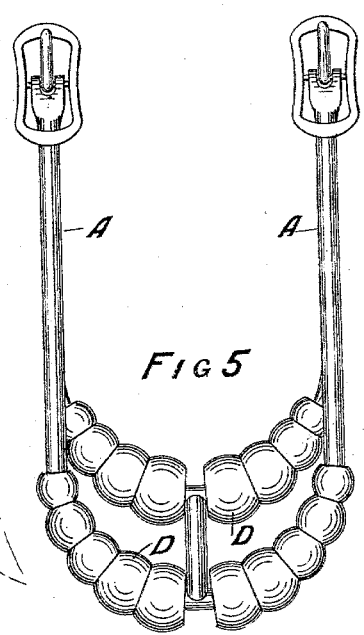
Witnesses
Inventor

UNITED STATES PATENT OFFICE.

HENRY CAVE, OF RANGIORA, NEW ZEALAND.

CRUPPER FOR RESTRAINING HORSES FROM KICKING.

SPECIFICATION forming part of Letters Patent No. 569,812, dated October 20, 1896.

Application filed November 30, 1895. Serial No. 570,652. (No model.)

*To all whom it may concern:*

Be it known that I, HENRY CAVE, a subject of the Queen of Great Britain and Ireland, and a resident of Rangiora, Canterbury, in the Colony of New Zealand, have invented certain new and useful Improvements in Cruppers for Restraining Horses or other such Like Animals from Kicking or Bucking, of which the following is a specification.

The object of this invention is to restrain horses or other such like animals from kicking or bucking. By its application to kicking or bucking horses or other such like animals they are prevented from drawing down their tails between their legs, and thus restrained from kicking or bucking, as they otherwise would.

My invention consists of forming on or attaching to the crupper a projecting rest or support for the tail, so that when the crupper is placed in position the said rest or support effectually prevents the tail from being drawn down by the animal, and therefore restrains it from kicking or bucking, and also prevents it, when in harness, from having the power to grip the reins with its tail.

Referring to the drawings which form a part of this specification, Figure 1 represents a side view of a crupper, showing the projecting rest or support for the animal's tail. Fig. 2 represents a back view of same. Fig. 3 represents a view showing the crupper having the projecting rest or support in position on a horse. Fig. 4 represents another view showing the crupper having the projecting rest or support in position on a horse, and also showing an inverted rein attached to the said rest or support, as hereinafter described. Fig. 5 represents a back view of a crupper, having beads or rollers thereon.

Similar letters refer to similar parts in all figures.

A is the crupper.

B is the projecting rest or support for the animal's tail, which may be formed of any desired number of parts and of varying forms or shapes, either supported on the under side or suspended on the upper side. C, Fig. 4, is the supplemental rein, connected to the said rest or support for the tail, and thence passing through a ring or other suitable contrivance on top of breeching and back to the driver. Thus absolute control of both the head and tail of the animal may be obtained.

The crupper and rest or support may be designed and constructed in one, as shown, or in sectional parts connected together, and may also be constructed of any suitable material, metal or metals, leather, hide, or any other flexible material, such as vulcanite, ebonite, rubber, or composite.

The crupper may be easily attached to or detached from the crupper-strap by means of buckles, as shown.

The crupper and rest or support for the tail may also be made either hollow or solid, cast, molded, or otherwise, and the flexible material may be of such a nature as to be inflated, as may become necessary to form the requisite rest or support, by compressed air, water, or any other suitable liquid or gas (at the discretion of the person applying it).

Preferably I construct my improved device A in the main of substantially a U-shaped piece, the extremities $a\ a$ of which are provided with suitable buckles or other fastenings $b\ b$ for attachment to the breeching-strap or other part of the harness. The projecting rest or support B is formed with the part A to constitute an integral portion thereof, and the two parts are joined by a connecting-strip $e$, which is for the purposes of strengthening the device as well as to furnish a means of fastening or attachment for the end of the supplemental rein C. In this way, if at any time the device should slip or prove of itself ineffective in properly supporting the tail of the animal the driver has simply to draw or pull upon the said supplemental rein, whereupon the device will be lifted and likewise the tail.

The said crupper and rest or support for the tail may also (if desired) be made of such material, upon which beads or balls D, Fig. 5, of varying forms and sizes may be threaded so as to roll or turn upon the said crupper and rest or support in order to prevent the part or parts bearing upon the animal from causing friction or irritation.

The said crupper and rest or support for the tail may in some cases combine the advantage and serve the purpose of a crupper and what is known as a "kicking-strap."

The rest or support for the tail may be so constructed and arranged that it may be attached to cruppers in ordinary use, and when not required may be removed at will. It may also be so arranged as to work upon joints, hinges, or such like means, or be adjusted by screws, pins, rivets, springs, or other suitable contrivances in order to form the requisite support for the animal's tail.

The said crupper and rest or support for the animal's tail will be beneficial when used on mares when in season, a great protection to horse-breakers when handling vicious and obstinate animals, of great service when the bot-fly and other stinging insects are troublesome, a protection to life and property, and generally an indispensable requisite in controlling horses or other such like animals.

Having now described my invention, what I claim as new, and desire to secure by Letters Patent, is—

A harness attachment for the purpose herein set forth, the same comprising a substantially U-shaped device having the ends provided with fastenings, the projecting rest or support joined to said device by a connecting-strip, and a supplemental rein attached to said strip and adapted to be passed through a guide on the harness, substantially as shown and for the purpose described.

In testimony whereof I have signed my name to this specification in the presence of two subscribing witnesses.

HENRY CAVE.

Witnesses:
A. H. HART,
W. WOODWARD.